Dec. 23, 1947.    A. E. FOSTER    2,433,108
HEADSPACE GAUGE
Filed Oct. 19, 1945

INVENTOR.
ALDEN E. FOSTER,
BY
ATTORNEY.

Patented Dec. 23, 1947

2,433,108

UNITED STATES PATENT OFFICE 2,433,108

HEAD SPACE GAUGE

Alden E. Foster, Glendale, Calif., assignor of one-half to Aaron H. Shum, Los Angeles, Calif.

Application October 19, 1945, Serial No. 623,198

4 Claims. (Cl. 33—147)

This invention relates to gauges of the type adapted to determine minute variations of longitudinal spacing within cylindrical or tapered apertures. As a preferred embodiment, the invention provides a hydraulic gauge for determining the headspace or terminal clearance in a rifle or gun.

It is very important in firing rifles that the base of the cartridge fit snugly in the chamber, since quite minute enlargements of this clearance have resulted in many serious accidents in the past. Indeed such small variations in the headspace of guns, as on the order of a thousandth of an inch, have resulted in the loss of fingers, loss of eyesight, and other serious disfigurements of the user when explosive pressure in the enlarged chamber caused the case to be ruptured, the bolt to be blown off the gun, or other serious incidents of backfire to occur.

Accordingly, it is an object of the present invention to provide a gauge for a rifle which will readily and automatically measure the actual headspace of the firing chamber.

Another purpose is to provide a device of the character described which will magnify the determined minute variations in headspace so that they may be easily read upon removal of the gauge.

Other objects and advantages will become apparent as the description progresses, it being understood that the particular embodiments herein shown are given by way of illustration rather than as limitations of my invention, the novelty of which consists in the features of construction, combination of parts, the unique relations of the members and the relative proportioning and disposition thereof, all as more completely outlined herein.

Referring to the drawings.

Figure 2:
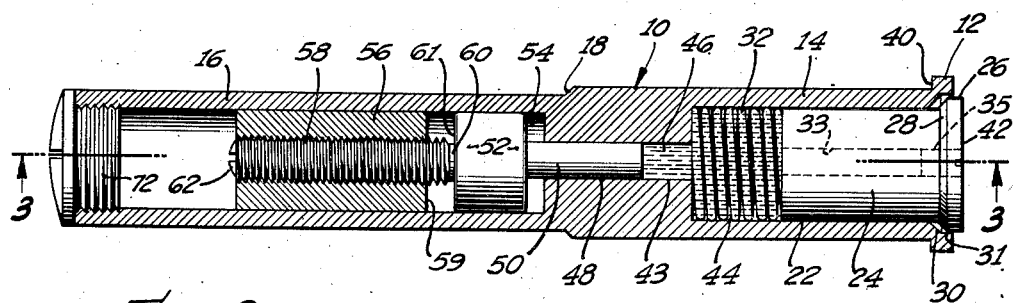
Fig. 2 is a sectional view along the line 2—2 of Fig. 1 showing the internal construction of the gauge and in particular the arrangement of parts for magnification of the movement of the plunger when the rifle bolt is closed upon the gauge after its insertion in the firing chamber.
Figure 3:
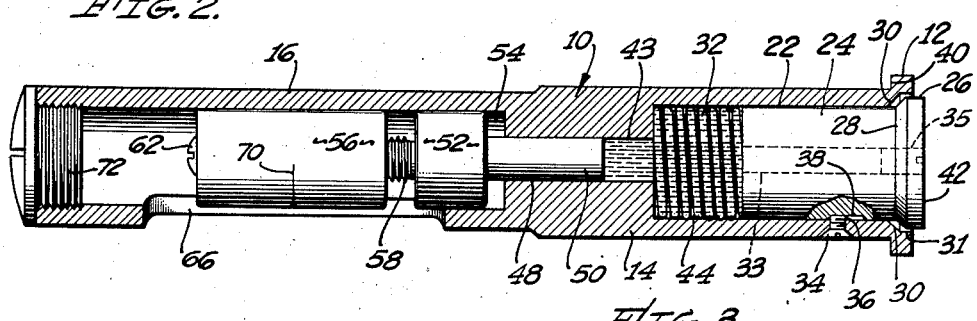
Figure 4:
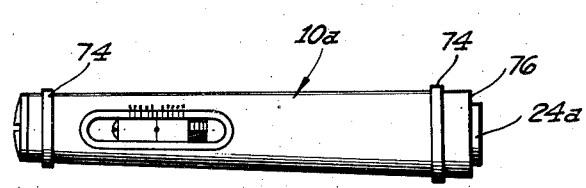

Fig. 3 is a sectional view along the line 3—3 of Fig. 2 with a part broken away to show the construction of the set screw which limits the outward movement of the plunger; and Fig. 4 is a side elevation of another form of my gauge applicable for use in a firing chamber which lacks a terminal annular groove; that is, a rifle which fires a rimless or center-fire cartridge, the amount of taper of the gauge being here exaggerated for purposes of illustration.

Figure 1:
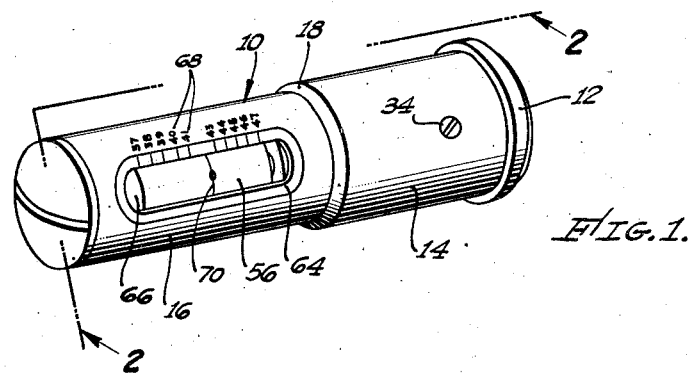
Fig. 1 is a perspective view of one form of my novel gauge which is adapted for use in a firearm using rim-fire cartridges or shells.

The form of my gauge set out in Figs. 1 to 3 consists of a cylindrical shell 10 having an annular rim 12 at one end thereof and coaxial segments 14 and 16 of greater and lesser circumferences, respectively, joined by a shoulder 18. The external diameter of segment 14 is adapted to fit snugly in the posterior end of the tapered bore of a firing chamber of the particular caliber rifle being tested, while the rim 12 fits into the rifle groove (not shown) adapted to receive the rim of a rim-fire cartridge. The reason for the smaller external diameter of segment 16 is to reduce the amount of surface which must be accurately machined to engage the rifle bore.

Internally, the larger or posterior end 14 of shell 10 contains an annular bore or aperture 22, in the open end of which is disposed a cylindrical plunger 24 bearing a circumferentially enlarged head or rim 26 joined to the body of the plunger 24 by means of conical neck 28. Desirably, this neck is coplanar with inwardly sloping surface 30 of counter-sunk mouth 31 of rim 12, within which the head 26 of the plunger recesses. For ease of assembly, plunger 24 is longitudinally traversed by a passage 33 by which fluid may be added or removed from the base of chamber 22, while, externally, passage 33 is sealed by a threaded plug 35, the face of which is flush with that of rim 26. By the present construction, plunger 24 fits snugly enough within chamber 22 as to provide a seal for liquid behind it in the chamber, but there is enough clearance for it to be slidable within the chamber.

Preferably the plunger is normally urged outward by resilient means such as helical spring 32 mounted in the interior or base portion of the chamber. At the same time, outward movement of plunger 24 is limited by a set screw 34 (Fig. 3), the internal end 36 of which projects into a longitudinal groove 38 extending for a limited distance along one side of the plunger. The opposite or inward limit of movement of plunger 24 is defined by the position of registration of conical neck 28 with inwardly sloping surface 30. Upon insertion in a cartridge chamber and movement of the closure face against the gauge, the rifle bolt or firing block (as the case may be) presses upon face 42 to move head 26 into registration with the posterior wall of the chamber, which in connection with face 40 of rim 12 thus spans the depth or headspace clearance of the chamber head.

Since the gauge illustrated in Figs. 2 and 3 is magnified approximately five times, the actual movement of the plunger 24 is obviously very small, the maximum movement being only in the neighborhood of 0.01 inch. Accordingly, means are provided for magnifying this small movement to permit direct visual reading of the dimension obtained so that minute changes may be readily recognizable. As here illustrated, this is accomplished by hydraulic means wherein the relatively small displacement of a large diameter piston 24 produces a considerably greater displacement of a much smaller piston 50, the ratio of their respective displacements being proportional to the difference in their diameters.

Two pistons operate in hydraulic chamber 43, composed of that portion 44 of chamber 22 anterior to plunger 24, together with a smaller coaxial portion 46. In the latter is disposed piston 50, composed of stem 48 slidably mounted within chamber 46, and enlarged head portion 52, also longitudinally movable within a chamber 54 of somewhat larger diameter than 46 and generally coextensive with the smaller segment 16 of the gauge.

An indicating member 56, here shown of cylindrical shape, is slidably mounted within the restricted portion 16 of the gauge, while an adjusting screw 58 is disposed in a threaded hole in the center of the indicator 56, and projects beyond the end thereof. The flat end 60 of said screw is adapted to abut against the free end of piston 52, while the opposite or outward end 62 is slotted to receive the end of a screwdriver or similar tool which may be used to vary the distance between end 61 of piston 52 and corresponding face 59 of the indicator by rotation of shaft 58 within the indicator while the latter is held against rotation.

In order to render the movement of indicator 56 externally visible, there is provided a suitable opening in the wall of the gauge, such as longitudinal slot 66, defined by sloping edge 64 along one side of which is engraved a scale 68 indicating in so many thousandths of an inch the headspace clearance obtained, as measured between the shoulder 40 of the rim 12 and the end 42 of the plunger 24. In the alternative, the scale may indicate the length of the firing chamber; that is, the normal or minimum length plus the amount registered by the plunger. A circumferentially disposed index line 70 upon the exposed side of indicator 56 indicates on the scale the dimensions obtained in the rifle and may be set by adjustment of screw 58 to show the optimal headspace clearance for a firing chamber of the particular caliber gun with which the specific gauge is usable.

Since the helical spring 32 normally urges plunger 24 outward when the gauge is not in use, the piston 52 being drawn correspondingly toward the head of the gauge by suction, the slidable indicator 56 may at such time be moved to its position of abutment against face 61 of the piston by manual manipulation through the slot 66, as by pressure of a finger or thumb against the exposed face of the indicator. Optionally a sealing plug 72 threadedly closes the anterior end of gauge 10. Accuracy of the gauge may be checked, whenever desired, by inserting it into any suitable fixture (such as a micrometer) having provision for depressing and holding the plunger 24 to the exact headspace clearance specified, whereupon the adjusting screw is turned in or out to bring the index line 70 to read on the scale 68 the dimension provided.

As mentioned earlier, the external circumference of gauge 10 should conform to the internal dimension of the firing chamber, first to prevent the gauge from wobbling upon insertion in the chamber, and second to insure its insertion to a fixed point (such as shoulder 40) from which the headspace may be determined. This may be accomplished by having a considerable section (or all) of the gauge shell 10 conform to the bore of the rifle as in Figs. 1–3, or it may be effected as in the embodiment of the invention illustrated in Fig. 4 by two (or more) circumferential bosses or bands 74, preferably terminally situated along the shell 10a, which bands fit snugly into the particular gun chamber in such location that posterior face 76 of the gauge will be flush with the end of the firing chamber, from which point the plunger 24a measures the headspace or distance to the closure face of the rifle as in the earlier form.

This embodiment of the invention illustrated in Fig. 4 is particularly adapted for use in a rifle lacking a terminal groove such as would receive annular shoulder 40 of the prior embodiment. In other respects, the internal construction of the gauge is similar to the former embodiment, it being understood that in either event the circumferential faces of registration of the gauge used correspond to the internal diameter of the particular firing chamber being measured; that is, a gauge adapted to test the headspace clearance of one caliber rifle is not applicable for a rifle of greater or lesser caliber.

In operation, when the gauge is inserted in the firing chamber and the bolt closed thereupon, pressure of the closure member against face 42 of plunger 24 forces fluid (such as oil) in chamber 44 into chamber 46, thereby moving piston 52 which in turn slides indicator 56, the amount of magnification of the movement of plunger 24 exhibited by piston 50 being the ratio of the cross-sectional area of chamber 44 to that of 46. Upon release of the rifle bolt, the plunger 24 springs out under pressure of helix 32 and the piston stem 48 is pushed back toward the head of the gauge by air pressure upon its anterior face 61. The indicator 56, however, not being a part of the closed hydraulic system, remains in its previous position so that the headspace clearance may be read upon the scale 68 when the gauge 10 is withdrawn from the rifle.

While the relative proportions and particular shapes of the several members of the present construction are those at present thought preferable, it is to be understood that they are set out by way of illustration only and that no limitation is intended thereby except as defined by the following claims.

I claim:

1. A hollow cylinder having open ends and adapted to be inserted in the firing chamber of a gun; a plunger longitudinally slidably mounted in one end of said cylinder and having a flat-ended head protruding therefrom; means for posteriorly urging said plunger and other means for limiting said posterior movement; a primary fluid chamber anterior to said plunger and in communication therewith; a second fluid chamber of lesser sectional area than and in communication with said primary fluid chamber; a piston slidably mounted in said second chamber; an externally-visible longitudinally movable indicator; means for adjustably spacing said indicator from the head of said piston; and correlating characters adjacent said indicator whereby the headspace of said firing chamber may be determined.

2. A hollow cylinder having open ends and adapted to be inserted in the firing chamber of a gun; a plunger longitudinally slidably mounted in one end of said cylinder and having a head protruding therefrom; means for posteriorly urging said plunger and other means for limiting said posterior movement; a primary fluid chamber anterior to said plunger and in communication therewith; a second fluid chamber of lesser sectional area than and in communication with said primary fluid chamber; a piston slidably mounted in said second chamber; an externally-visible longitudinally movable indicator slidably mounted in said cylinder; edges defining an opening in said cylinder adjacent said indicator whereby said indicator may be manually slid within said cylinder when removed from the gun; means for adjustably spacing said indicator from the head of said piston; and correlating characters adjacent said indicator whereby the headspace of said firing chamber may be determined.

3. A hollow cylinder having open ends and circumferential bosses near each end which adapt it to fit snugly in the tapered firing chamber of a gun; a coaxial plunger slidably received in the posterior end of said cylinder, having an externally projecting flat-ended head and a removable plug disposed in a longitudinal aperture traversing said plunger; a primary fluid chamber within said cylinder adjacent said plunger and in communication with the latter; a helical spring within said chamber adapted to urge said plunger posteriorly; a groove axially disposed partway along a side of said plunger; a set screw mounted in the side of said cylinder and projecting into said groove whereby the posterior movement of said plunger is restricted; a second fluid chamber substantially coaxially aligned with said cylinder and located anteriorly of said primary fluid chamber, said second fluid chamber being of lesser sectional area than and having its posterior end in communication with said primary fluid chamber; a piston disposed in the anterior end of said second fluid chamber; a cylindrical indicating member slidably mounted within said hollow cylinder anterior to said piston and having a tapped aperture therein extending substantially axially of said cylinder; a threaded shaft disposed in said aperture, having a flat end adapted to engage the head of said piston and having a slotted head adapted to be rotated from the anterior aperture of said hollow cylinder; a sealing plug threadedly engaged in said anterior aperture; an edge defining a longitudinal slot in the side of said hollow cylinder adjacent said indicating member; and correlating characters adjacent said edge whereby the headspace of said firing chamber may be determined.

4. A hollow cylinder adapted to fit snugly in the firing chamber of a gun and having open ends, a posterior terminal shoulder and successive segments of greater and lesser circumference; a coaxial plunger slidably received in the posterior end of the segment of said cylinder of greater diameter, and having a posteriorly tapered neck, an externally projecting flat-ended head and a removable plug mounted in a longitudinal aperture traversing said plunger; a primary fluid chamber within said cylinder adjacent said plunger and in communication with the latter; a helical spring within said chamber adapted to urge said plunger posteriorly; a groove axially disposed partway along a side of said plunger; a set screw mounted in the side of said cylinder and projecting into said groove whereby the posterior movement of said plunger is restricted; a second fluid chamber substantially coaxially aligned with said cylinder and located anteriorly of said primary fluid chamber, said second fluid chamber being of lesser sectional area than and having its posterior end in communication with said primary fluid chamber; a piston disposed in the anterior end of said second fluid chamber; a cylindrical indicating member slidably mounted within said hollow cylinder anterior to said piston and having a tapped aperture therein extending substantially axially of said cylinder; a threaded shaft disposed in said aperture, having a flat end adapted to engage the head of said piston and having a slotted head adapted to be rotated from the interior aperture of said hollow cylinder; a sealing plug threadedly engaged in said anterior aperture; an inwardly sloping edge defining a longitudinal slot in the side of said hollow cylinder adjacent said indicating member; and correlating characters adjacent said edge whereby the headspace of said firing chamber may be determined.

ALDEN E. FOSTER.

REFERENCES CITED

The following references are of record in the file of this patent:

UNITED STATES PATENTS

| Number | Name | Date |
| --- | --- | --- |
| 1,351,721 | Eickhoff et al. | Aug. 31, 1920 |
| 1,557,846 | Kallensee | Oct. 20, 1925 |
| 1,994,388 | Erichsen | Mar. 12, 1935 |
| 2,035,029 | Thomas | Mar. 24, 1936 |